United States Patent
Cooper

(10) Patent No.: US 6,764,194 B1
(45) Date of Patent: Jul. 20, 2004

(54) HEADLIGHT WITH UNIVERSAL MOUNTING

(75) Inventor: Ira Jeffrey Cooper, Lexington, KY (US)

(73) Assignee: Ira J. Cooper, Lexington, KY (US)

( * ) Notice: Subject to any disclaimer, the term of this patent is extended or adjusted under 35 U.S.C. 154(b) by 0 days.

(21) Appl. No.: 10/216,146

(22) Filed: Aug. 9, 2002

(51) Int. Cl.$^7$ ............................................. F21V 21/084
(52) U.S. Cl. ..................... 362/105; 362/35; 362/103; 362/106; 362/226; 362/389; 362/419; 362/426; 362/427; 362/430; 362/431; 362/800
(58) Field of Search ................................ 2/209.13, 160, 2/905; 362/105, 35, 103, 106, 220, 226, 285, 288, 389, 418, 419, 426, 427, 430, 431, 800

(56) References Cited

U.S. PATENT DOCUMENTS

| | | | |
|---|---|---|---|
| 4,991,068 A | * | 2/1991 | Mickey ....................... 362/106 |
| 5,485,358 A | | 1/1996 | Chien |
| 5,667,291 A | | 9/1997 | Caplan et al. |
| 5,667,292 A | * | 9/1997 | Sabalvaro, Jr. .............. 362/106 |
| 5,676,449 A | * | 10/1997 | Newsome .................... 362/106 |
| 5,680,718 A | | 10/1997 | Ratcliffe et al. |
| 5,709,459 A | * | 1/1998 | Gourgouliatos et al. .... 362/105 |
| 6,290,368 B1 | * | 9/2001 | Lehrer ......................... 362/187 |
| 6,467,929 B2 | * | 10/2002 | Lee ............................. 362/191 |

* cited by examiner

Primary Examiner—Stephen Husar
Assistant Examiner—Sharon Payne
(74) Attorney, Agent, or Firm—King & Schickli, PLLC

(57) ABSTRACT

A headlight for use on a head gear, or the like, is provided. A LED serves as a light source mounted on a clamp for attachment to the head gear in any one of the three orientation planes. A universal mount of the light source on the clamp allows the light beam to be directed by up and down, as well as by side-to-side, manual adjustment. The beam covers substantially all frontal objects without changing the position of the clamp. A pair of pivot connections, or a ball and socket mechanism, exhibit sufficient frictional engagement to hold the light source in position. The pivot connection may be used to support the ball on the light source in the second embodiment. The socket is split along its curvature lines and an O-ring extends around the split socket to assure frictional engagement to hold the light source in position.

11 Claims, 1 Drawing Sheet

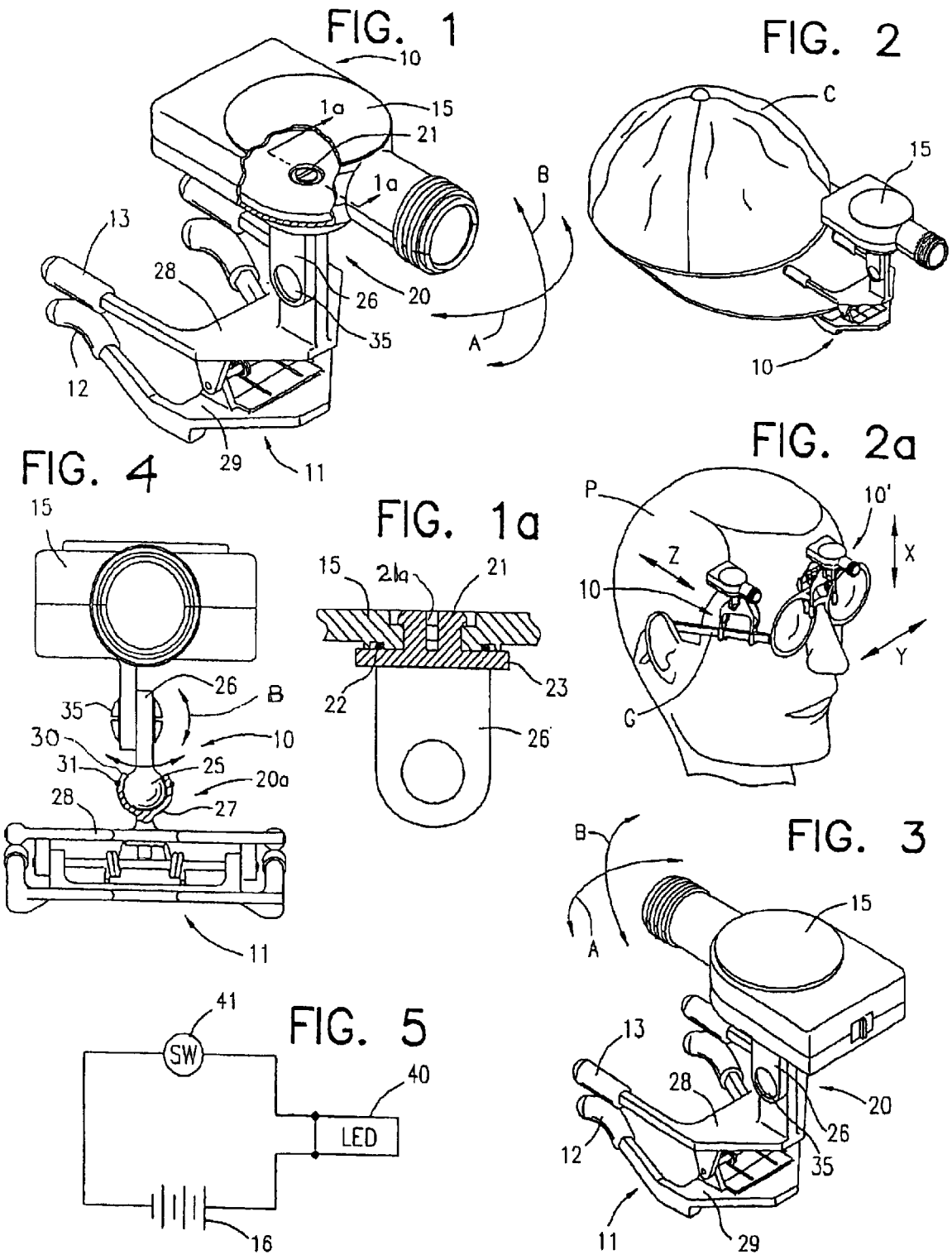

HEADLIGHT WITH UNIVERSAL MOUNTING

BACKGROUND OF THE INVENTION

The present invention relates to personal headlights, and more particularly, to an illumination assembly with a clamp for mounting on a head-mounted personal utility device, such as on caps, eyeglasses, face shields, surgical loupes and the like.

Personal headlights have their origin in providing light for miners and cave explorers. Typically, these headlights attach to the front of a helmet or to a relatively heavy headband. In order to insure that the headlight is secure, in addition to the band that goes around the head, a second band is usually required to extend across the crown of the head and be attached to the headband. The miner's type headlight is typically an incandescent or flourescent lamp that is powered by a battery supported by the headband, or in some cases by a battery on the belt of the user.

From this beginning, other types of personal headlights have evolved, such as those worn by surgeons, and other medical or dental professionals. The state of the art in these surgical and other medical type headlights is now very advanced. In the most popular form, a fiber optic light guide is used to bring the light energy from a remote unit to the headlight. However, this means that the light, and thus the head of the user, is tethered to the light guide, providing some restriction of movement. This restriction, and the relatively heavy nature of the device, as well as the cost, is quite acceptable in the surgical and like environments. However, when it comes to the personal, more casual use, such as from running or jogging to reading a book to light maintenance duties around the house, a headlight that is more adapted to be mounted on personal head gear, and is light in weight and low in cost, is needed.

In my prior copending U.S. Design patent application, Ser. No. 29/153,277, entitled Cap Mounted Headlight, now U.S. Pat. D464750, issued Oct. 22, 2002, I have disclosed and claimed such a personal headlight with a clamp for attaching to the bill of a standard baseball cap. Thus, this headlight has been successful in partially filling this need, as set forth above. While this headlight has been very successful in the market, it will be realized that its use has been restricted to those situations where wearing a cap is desired or appropriate. Also, it is somewhat limited even when used on a cap, since the adjustment that is available is about a single horizontal pivot, i.e. the adjustment is for allowing a pivoting up and down movement. Furthermore, due to the necessity to have a substantially horizontal mounting place, such as on the bill of the cap, it is now realized that essentially the only type of conventional head mounted utility device, that can easily be used for receiving the clamp, is the baseball cap.

Having a light per se mounted on a cap is known. For example, the patent to Chien 5,485,358 shows a baseball type cap having light emitting diodes [LEDs] positioned on the back and side of the cap as a novelty, such as for providing an "eye-catching light show for use in night time activities." As is apparent, such an arrangement, has no utility for providing a light beam that can be directed toward substantially all frontal objects for viewing those objects. Also, there is no provision for allowing illumination, regardless of the plane of orientation, since the attachment in the '358 patent is not subject to any adjustment.

Similarly, there are examples of the use of illumination systems for the medical and dental professions, as mentioned above, that utilize clamps to be attached to utility devices carried by the head of the user. The Caplan et al U.S. Pat. No. 5,667,291 shows a fiber optic light guide that is mounted on a clamp and provided with a single horizontal pivot adjustment to direct the light emitting end of the light guide to the viewing or work area. In this '291 patent the utility device for mounting the light is taught as the viewing glasses/binoculars. The requirement for tethering the user to the remote light source, and electrical power, can be acceptable to some in this environment, but for casual uses, as I have contemplated, such a restriction is unacceptable.

In view of the above state of the art, it would be desirable to provide a self-contained illumination assembly that takes care of the above described shortcomings. The assembly is required to be simple and low in cost, but very functional in that it can be used for virtually any casual lighting situation, including sports, reading, sewing, light maintenance work and similar things. A feature that would characterize the assembly is a universal mount on a clamp for the light source. The clamp must attach to virtually any head gear, or other personal utility device. The light source should properly direct its light beam regardless of the plane of orientation of the head gear or utility device. Furthermore, having a secondary adjustment is contemplated for even greater range of frontal illumination.

SUMMARY OF THE INVENTION

It is in view of this background, and these objectives that are set forth, the present invention succeeds in providing an illumination assembly that finds wide spread application in the field of casual use, and also light work use. A clamp provides for attachment to any one of several utility devices that are commonly adapted for mounting on the head of a user, such as head gear, including the bill of a cap, eyeglasses, goggles, a face shield and a variety of head bands, as well as surgical and dental eye wear, or the like, including loupes and binoculars. The clamp is characterized by the ability to conveniently mount on any one of these utility devices and others, in any of the X, Y and Z planes or modes, by virtue of a choice of two unique universal mounts of the light source. As a result, the light can easily be directed properly for viewing. The objective of frontal viewing is important since the illumination assembly of the present invention is intended for useful, rather than for a novelty purpose. A battery that is a part of the assembly serves to power the light source, and therefore make the assembly self-contained, and thus not subject to the restriction of a tether.

Preferably, the universal mount takes the form of either a pair of pivot connections or a ball and socket mechanism. In the first embodiment, the first pivot connection is positioned vertically between the light source and the depending support arm. The second or horizontal pivot connection thus extends at substantially 90 degrees and connects two sections of the support arm that is attached to the base of the clamp. Both connections work in concert for universal adjustment of the light source, and each exhibits sufficient frictional engagement to hold the light source in position after so being manually adjusted.

In a second embodiment, a socket is carried by the base of the clamp and a mating ball is carried on the light source, or in the broader sense, vice-versa. The ball is preferably spherical and has sufficient frictional holding force to maintain its adjustment in the socket for properly directing the beam of light once it is released from manual adjusting engagement. As a result of this feature, or the corresponding feature having the pair of pivot connections, the light source can be moved around in a full range of movement, both in an up and down sense, as well as with respect to side to side.

With respect to the ball and socket or second embodiment, the pivot connection on the depending arm can be used for secondary and extended adjustment. This connection works in concert with the universal ball and socket adjusting movement. In both embodiments, the pivot connection comprises a horizontal pivot pin and it is designed to have an extended range of up and down adjustment of the light source.

The specific ball and socket mechanism that is provided to establish the second embodiment, includes a spherical ball and a mating spherical socket. There is one or more splits in the socket along its lines of curvature to provide for curved fingers for gripping the ball. An elastic O-ring is stretched around the outer periphery socket, pressing fingers inwardly to assure that the designed frictional holding force is maintained.

The light source preferably utilizes a light emitting diode [LED]. This light source has proven to be highly effective in providing a level of illumination that is necessary for the casual use, or for the light maintenance work, as contemplated during the development of the present invention. The low cost and minimum power usage, coupled with the relatively high level of light intensity of the LED, makes this selection ideal for the illumination required to meet my objectives.

Still other objectives and advantages of the present invention will become readily apparent to those skilled in this art from the following description wherein there is shown and described the two preferred embodiments of this invention, simply by way of illustration of the modes that are best suited to carry out the invention. As it will be realized, the invention is capable of still other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings are incorporated in and forming a part of the specification, illustrate several aspects of the present invention, and together with the description serve to explain the principles of the invention. In the drawings:

FIG. 1 is a perspective view of the illumination assembly of the present invention, which includes the clamp and the universally mounted light source through a pair of pivot connections;

FIG. 1a is a detailed cross-sectional view taken through the pivot connection for the light source of FIG. 1;

FIG. 2 is a perspective view of said assembly in position on a utility device for use as a typical headlight, by being clamped and extending forwardly from the bill of a baseball type cap;

FIG. 2a is a perspective view of a person's head having another type of utility device, namely eyeglasses or goggles, with illumination assemblies mounted on the bridge and the ear piece thereof;

FIG. 3 is a perspective view of the illumination assembly with the light source repositioned in a manner to allow its use similar to that shown in FIG. 2a;

FIG. 4 is a front view of the second embodiment of the illumination assembly with the ball and socket mechanism, positioned in the manner to be used in the same manner as the headlight assembly of FIG. 1; and FIG. 5 is a schematic diagram showing the basic circuit for use to power the LED as the light source.

Reference will now be made in detail to the present preferred embodiments of the invention, examples of which are illustrated in the accompanying drawings.

DETAILED DESCRIPTION OF THE PREFERRED EMBODIMENTS

With reference specifically to FIGS. 1, 2 and 2a, there is a specific showing of a first embodiment having the several features of the present inventive concepts, as applied to the field of personal illumination devices. It is to be understood that as illustrated, the concepts apply to lighting that is intended for useful functions, such as for use in sporting endeavors at dawn, dusk or after dark, and for simple maintenance projects in darkened places. It is not intended that the teachings of the present invention be directed to novelty uses, or the like.

Thus, a self-contained, illumination assembly 10 is designed as a headlight for a person P wearing a utility device, such as a typical baseball style cap C and eyeglasses G, as represented in FIGS. 2 and 2a. The assembly includes a clamp 11 for attachment to the selected utility device. As shown, the clamp position mode can be in substantially any one of three orientation planes, as designated by the action arrows X, Y and Z in FIG. 2a. Regardless of the situation, the plane passing through the grippers 12, 13 of the clamp 11 can be in the Y plane, as shown with respect to the cap C, in the X plane, as illustrated with respect to the use on the bridge of eyeglasses G and in the Z plane, as representative of use on the ear piece of the glasses. According to the invention, as will be seen in even greater detail below, illumination by light source 15 powered by the battery 16 [see also FIG. 5], with the assembly 10 being mounted in any of the three modes, gives exceptional results in terms of frontal illumination for viewing.

A key feature allowing the adjustment of the light source 15 to provide frontal lighting for viewing regardless of the X, Y or Z mode of mounting of the clamp 11 is the universal mount or joint, generally represented by the reference numeral 20. With respect to FIGS. 1 and 3, it can be seen that the light source 15 can be adjusted through a full 360 degrees. The FIG. 1, or Y mode is for use when attachment is to the bill of a cap, as shown in FIG. 2, and the FIG. 3, or X mode represents the adjustment for attachment to the bridge of the eyeglasses, as shown in FIG. 2a. In other words, when the light source 15 is extending straight out from the clamp 11 as in FIG. 1, it can be attached to the bill of the cap C in the Y mode for straight ahead lighting, such as would be used for running or jogging. Similarly, for simple maintenance projects where light is needed in darkened places, the cap C can be worn and the light source 15 projects a straight ahead beam to illuminate the device being serviced. Upon manual 180 degree rotation as in FIG. 3, then the clamp C can be attached to the bridge of the eyeglasses G in the X mode for reading, sewing or other close up work.

In either of these two FIGS. 1 and 3, Y, X modes respectively, the universal mount 20 also allows side to side movement for fine adjustment of the emitted light beam, as represented by the action arrow A. By the same token, the universal mount 20 allows an up and down movement to adjust the beam, as represented by the action arrow B. Furthermore, because of the universal nature of the adjustments designated A and B, there can be positioning of the light source 15 in any variation between these two directions. This versatility is unique to the illumination assembly 10 of the present invention. Not only can the use be adapted for mounting on such disparate utility devices as the bill of the cap C and the bridge of the eyeglasses G, but once positioned in that manner, full adjustment for the best direction of the light beam can be obtained.

The third mode of positioning of the illumination assembly 10 is along the side plane designated by the arrow Z in FIG. 2a. Specifically, this is the mounting that is represented by positioning the clamp 11 on the ear piece of the eyeglasses or goggles G. In this mode, the illumination device can be moved forwardly or rearwardly along the earpiece. It is contemplated that the light source 15 is normally angled toward the front so that the light beam comes along the side of the head of the person P. The universal mount 20 allows the light source 15 to be so manually rotated (in the direction of the action arrow A, in the FIG. 3 showing) for this purpose. The light beam can be used for the close up work, such as reading or sewing, and can be used alone on in combination with other illumination assemblies 10, as desired.

The universal mount 20 preferably takes the form of one of two embodiments. The first embodiment, best illustrated in detail in FIG. 1 centers around depending arm 26 mounted to the light source 15 through an upstanding or vertical post 21. A split in the post 21 allows easy, snap action assembly and the two halves are spring biased outwardly against the smaller aperture to provide sufficient frictional engagement to maintain the light source 15 in position after manual adjustment. Specifically the post 21 extends upwardly from the disc 23, and includes a center space 21a, thus forming the two halves, which thereby comprises a split frictional retainer. The spring action is provided by the inward flexing of the post halves into the space 21a, as clearly illustrated in FIG. 1a. The second pivot connection 35 divides the arm 26 into two sections and forms the horizontal pivot point of this form of the universal mount 20.

In the second embodiment, a universal mount 20a is a ball and socket mechanism, and specifically a spherical ball 25 is carried on the depending arm 26 of the light source 15. The ball 25 mates with a socket 27 carried on a base 28 of the clamp 11. A spring biased, pivotable fork 29 carries the grippers 12 that mate with the grippers 13 on the base 28 that allows the clamp 11 to grip in any of the X, Y, Z modes (cf. FIG. 3). If desired, the ball and socket 25, 27 can be switched between the base 28 and the light source 15 within the broader aspects of this portion of the present invention.

In order to maintain the frictional engagement between the ball and socket 25, 27, a suitable structural arrangement is necessary, such as providing slits along the lines of curvature of the socket 27 to form fingers 30 that pinch inwardly against the outer surface of the spherical ball 25. These fingers are illustrated by the gap or space represented on the left side of the upper edge of the socket 27; it being understood that the socket 27 is broken away in order to show ball 25. In order for the frictional force to remain free enough for the adjustments to be made relatively easy, but to cause the ball 25 to remain firm in the socket once that the adjustment is made in any one of the three positioning modes X, Y or Z, an elastic O-ring 31 is provided in a groove stretched along the outer perimeter of the fingers 30.

In either embodiment, the frictional holding arrangement allows for release of the holding force in the event that the light source 15, or any other part of the assembly 10, is inadvertently bumped to prevent the damage to the assembly.

To provide an additional or secondary adjustment to be used in concert with the adjustment through the universal mount 20a, the pivot connection 35 can be retained on the arm 26. The pivot bolt of the connection 35 in either embodiment is tightened just enough to hold the two sections of the arm in position once this adjustment is made. The up and down movement provided by this feature is in the direction of the action arrow B, explained above with respect to FIGS. 1 and 3.

The light source 15 preferably includes a white LED 40 for maximum illumination (see FIG. 5). It is the best choice, not only for its exceptional output for its size and suited for this illumination assembly 10, but also for its relatively light weight, low cost and low power requirements. A switch 41 is connected in the circuit for controlling the on/off function between the battery 16 and the LED 40. The battery 16 is in the housing of the light source (see FIGS. 1, 3), and the switch 41 is conveniently positioned on the back of the housing.

The results and advantages of the illumination assembly 10 of the present invention should now be fully apparent. A universal mount 20, 20a allows the light source 15 to be efficiently positioned on the head gear or other utility device of choice, in a virtually infinite range of adjustment with respect to the clamp 11, so that the light beam can be most effectively directed toward all frontal objects. This adjustment capability is obtained regardless of the positioning of the assembly 10 on the head gear in any of the X, Y or Z modes. The pair of pivot connections and the ball 25 and socket 27 mechanism that forms the mounts 20, 20a are easy to adjust, and yet are secure when released to hold the light source 15 in position, even when used in conjunction with an active sport, such as running. At the same time, in the event that the assembly is inadvertently bumped during use, either mount 20, 20a allows release without damage to any part. The pivot connection 35 forms one of the pivot connections of the first embodiment, and allows for a secondary adjustment that provides additional versatility in the second embodiment. The LED 40 is the choice for the light source 15. The entire illumination assembly 10 is low in initial cost and provides an exceptional combination of performance and minimum weight that makes it highly desirable for all personal and casual head lighting needs.

The foregoing description of two preferred embodiments of the invention has been presented for purposes of illustration and description. It is not intended to be exhaustive or to limit the invention to the precise form disclosed. Obvious modifications or variations are possible in light of the above teachings. These embodiments are chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitable entitled.

What is claimed:

1. A self-contained, illumination assembly for use with a head-mounted personal utility device, comprising:

a clamp for attachment to said utility device substantially in any one of three orientation planes;

a light source for emitting a light beam;

a battery for powering said light source, and a universal mount for said light source on said clamp, so that said beam can be directed toward substantially all frontal objects, said universal mount comprises a pair of pivot connections substantially perpendicular to each other to support said light source, said pivot connections providing an adjustment of said light source by up and down and side to side movement relative to said base and firm frictional retention in the adjusted position, whereby illumination is assured by said light source for viewing regardless of the plane of orientation of the clamp attachment to said utility device.

2. The illumination assembly of claim 1, a depending arm on said light source, said pair of connections provided on said depending arm.

3. The illumination assembly of claim 2, one of said connections including an upstanding post on the end of said depending arm contiguous with said light source;

an aperture in said light source to receive said post; and a split frictional retainer for said post, having sufficient frictional engagement to hold said light source in position after manual adjustment, and whereby the side to side movement may be provided.

4. The illumination assembly of claim 3, said upstanding arm including two sections frictionally connected by a pivot fastener to form the other connection and having sufficient frictional engagement to hold said light source in position after manual adjustment whereby the up and down movement may be provided.

5. The illumination assembly of claim 1, said light source including a LED to emit said light beam.

6. A self-contained, illumination unit comprising:

a light source for emitting a light beam;

a battery for powering said light source, and a universal mount on a base for said light source so that said beam can be directed toward desired objects, said universal mount includes a pair of pivot connections substantially perpendicular to each other to support said light source, said pivot connections providing an adjustment of said light source by up and down and side to side movement relative to said base and firm frictional retention in the adjusted position;

whereby illumination is assured by said light source for viewing regardless of the plane of orientation of said base.

7. The illumination unit of claim 6, a depending arm on said light source, said pair of connections provided on said depending arm.

8. The illumination unit of claim 7, one of said connections including a disc and an upstanding post on the end of said depending arm contiguous with said light source;

an aperture in said light source to receive said post; and a split frictional retainer for said post, and an O-ring compressed by said disc, providing sufficient frictional engagement to hold said light source in position after manual adjustment, and whereby the side to side movement may be provided.

9. The illumination Unit of claim 8, said upstanding arm including two sections frictionally connected by a pivot fastener to form the other connection and having sufficient frictional engagement to hold said light source in position after manual adjustment whereby the up and down movement may be provided.

10. The illumination Unit of claim 6, said light source including a LED to emit said light beam.

11. A self-contained, illumination assembly for use with a head-mounted personal utility device, comprising:

a clamp for attachment to said utility device substantially in any one of three orientation planes;

a light source for emitting a light beam;

a battery for powering said light source, and a universal mount for said light source on said clamp, so that said beam can be directed toward substantially all frontal objects, said universal mount including a ball and a socket mechanism, said clamp includes a base and an opposed spring biased pivotable fork, said mechanism includes a socket mounted on said base and a mating ball on said light source, said ball has sufficient frictional engagement in said socket to hold said light source in position after manual adjustment by up and down and side to side movement relative to said base, said socket being split to form gaps along its lines of curvature, and an O-ring extending around fingers formed by the gaps on said socket to assure the firm frictional engagement, whereby illumination is assured by said light source for viewing regardless of the plane of orientation of the clamp attachment to said utility device.

\* \* \* \* \*